United States Patent
Kraft et al.

(10) Patent No.: US 12,415,588 B2
(45) Date of Patent: Sep. 16, 2025

(54) DRIVE UNIT

(71) Applicant: ZF Friedrichshafen AG, Friedrichshafen (DE)

(72) Inventors: Steffen Kraft, Blaustein (DE); Miran Percic, Heubach (DE); Rüdiger Nierescher, Schwäbisch Gmünd (DE); Klaus Kraft, Blaustein (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 432 days.

(21) Appl. No.: 17/913,573

(22) PCT Filed: Feb. 22, 2021

(86) PCT No.: PCT/EP2021/054258
§ 371 (c)(1),
(2) Date: Sep. 22, 2022

(87) PCT Pub. No.: WO2021/190842
PCT Pub. Date: Sep. 30, 2021

(65) Prior Publication Data
US 2023/0145689 A1    May 11, 2023

(30) Foreign Application Priority Data

Mar. 23, 2020 (DE) ............ 10 2020 203 714.0

(51) Int. Cl.
*B62M 6/50* (2010.01)
*H02K 5/22* (2006.01)
(Continued)

(52) U.S. Cl.
CPC .............. *B62M 6/50* (2013.01); *H02K 5/225* (2013.01); *H02K 7/083* (2013.01); *H02K 7/108* (2013.01); *H02K 11/21* (2016.01); *B62M 6/70* (2013.01)

(58) Field of Classification Search
CPC . B62M 6/50; B62M 6/70; B62M 6/55; H02K 5/225; H02K 7/083; H02K 7/108; H02K 11/21; H02K 7/116; H02K 11/215
See application file for complete search history.

(56) References Cited

U.S. PATENT DOCUMENTS

| 6,104,112 A | 8/2000 | Vanjani |
| 6,276,475 B1 | 8/2001 | Nakanosono |

(Continued)

FOREIGN PATENT DOCUMENTS

| CH | 654455 A5 * | 2/1986 |
| CN | 201105798 Y | 8/2008 |

(Continued)

OTHER PUBLICATIONS

International Search Report (English Translation) PCT/EP2021/054258, dated Apr. 23, 2021. (3 pages).

(Continued)

*Primary Examiner* — Mohamad A Musleh
(74) *Attorney, Agent, or Firm* — Dority & Manning, P.A.

(57) ABSTRACT

A drive unit (10) for a manually driven vehicle, in particular a bicycle or an EPAC, includes a housing (12), an electric motor (18) with a stator (44) and a rotor (46), a stator support (48), and an electronic unit (50). The stator support (48), the stator (44), the rotor (46), and the electronic unit (50) are designed in the form of one unit (56), which can be preassembled so that the preassembled unit (56) is installable into the housing (12).

12 Claims, 9 Drawing Sheets

(51) Int. Cl.
    *H02K 7/08*         (2006.01)
    *H02K 7/108*       (2006.01)
    *H02K 11/21*      (2016.01)
    *B62M 6/70*        (2010.01)

(56) References Cited

U.S. PATENT DOCUMENTS

| | | |
|---|---|---|
| 10,308,314 B2 | 6/2019 | Gao |
| 2003/0067228 A1* | 4/2003 | Vanjani .................... H02K 5/18 |
| | | 310/64 |
| 2011/0183805 A1 | 7/2011 | Chan |
| 2018/0015985 A1 | 1/2018 | Doerndorfer |
| 2020/0063793 A1 | 2/2020 | Rossberger |
| 2021/0094413 A1* | 4/2021 | Kim .................... B60K 17/046 |

FOREIGN PATENT DOCUMENTS

| | | |
|---|---|---|
| CN | 102310919 A | 1/2012 |
| DE | 10060507 A1 | 5/2002 |
| DE | 102009038912 A1 | 3/2011 |
| DE | 102014108611 A1 | 12/2014 |
| DE | 102015100676 B3 | 6/2016 |
| EP | 0980821 A2 | 2/2000 |
| EP | 2724926 A1 | 4/2014 |
| JP | 2005094841 A | 4/2005 |
| WO | 2018/096521 A2 | 5/2018 |

OTHER PUBLICATIONS

German Office Action DE 10 2020 203 714.0, dated Nov. 12, 2020. (8 pages).

\* cited by examiner

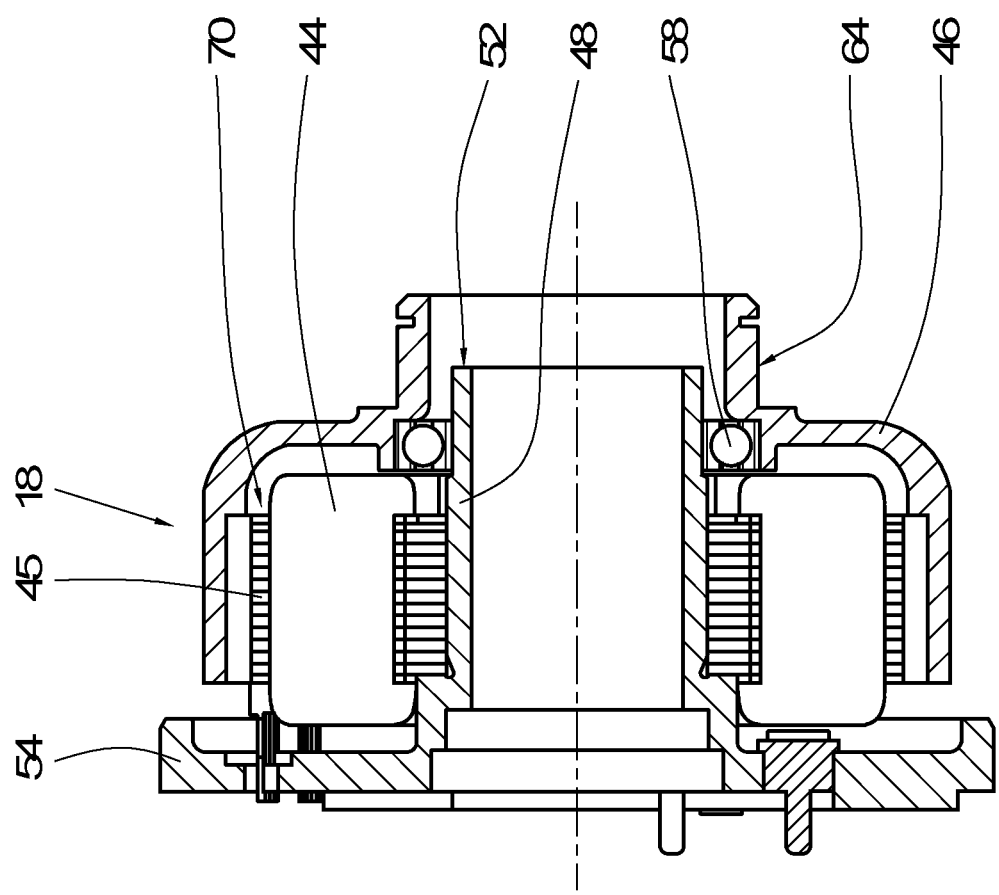

DRIVE UNIT

CROSS-REFERENCE TO RELATED APPLICATIONS

The present application is related and claims priority to 102020203714.0 filed in the German Patent Office on Mar. 23, 2020 and is a U.S. national phase of PCT/EP2021/054258 filed in the European Patent Office on Feb. 22, 2021, both of which are incorporated by reference in their entirety for all purposes.

FIELD OF THE INVENTION

The invention relates generally to a drive unit for a manually driven vehicle. In addition, the invention relates generally to an assembly with a wiring loom for a manually driven vehicle.

BACKGROUND

DE 10 2015 100 676 A1 discloses a drive assembly with a manual drive, an electric auxiliary drive, a harmonic drive, and a common driven element. The drive unit has a complex structure with a large number of individual components and bearing points.

EP 2 724 926 A1 discloses a central drive unit with a bottom bracket shaft for manual drive and an auxiliary drive with a motor and a planetary transmission downstream from the motor. This drive unit also has a relatively complex structure with a large number of individual components.

DE 10 2014 108 611 A1 discloses a bicycle drive device with a drive housing for receiving a bottom bracket shaft, and a harmonic drive which is arranged inside the drive housing and can be connected in driving fashion to a traction means carrier. This bicycle drive device also has a complex structure. Mounting has a complicated form.

SUMMARY OF THE INVENTION

Example aspects of the invention provide an improved drive unit. In particular, a reduced number of components, functional integration, and package optimization are desirable.

The drive unit is designed for a manually driven vehicle (operated by muscular force), in particular for a bicycle or an EPAC (Electrically Power Assisted Cycle). The drive unit can be a bicycle drive mechanism.

The drive unit has a housing, an electric motor with a stator and a rotor, a stator carrier, and electronics. The electronics can have an electronic circuit board or be designed as an electronic circuit board. The stator carrier, the stator, the rotor, and the electronics are formed as a pre-mountable unit (assembly) such that the premounted unit can be mounted as a whole in the housing of the drive unit, i.e., be arranged and fastened in the housing.

Handling during mounting is facilitated by combining the components to form an assembly. Thus, when assembling the drive unit, the combined components are not mounted in the housing of the drive unit individually and instead as an assembly. As a result, final mounting of the assembly can be optimized. In addition, a premounted and functionally testable assembly is provided by the combination of the components. Because the stator carrier does not fasten just the stator in the drive housing but also further components, the stator carrier fulfills multiple functions and greater functional integration and a reduction in the number of components can be achieved.

The drive unit can have a bottom bracket shaft, which is mounted rotatably in the housing of the drive unit, for a manual drive. In addition, the drive unit can have an auxiliary drive which has an electric motor and a harmonic drive as components, wherein the electric motor is coupled mechanically to the harmonic drive. The manual drive and the auxiliary drive can be coupled to a common output element on which, for example, a chain ring or a chain ring carrier is fastened.

The output element can be designed as a hollow shaft which surrounds the bottom bracket shaft in the axial direction in some regions radially on the outside. Freewheel clutches can be arranged radially between the bottom bracket shaft and the output element, one freewheel clutch of which couples the auxiliary drive or the harmonic drive to the output element, and a further freewheel clutch couples the bottom bracket shaft to the output element. The freewheel clutches can be arranged axially adjacent to each other and/or interact with an inner surface, in particular of the inner circumferential surface of the output shaft.

The harmonic drive can be coupled on the input side to the electric motor and on the output side to the output element. The harmonic drive can have a wave generator, a deformable cylindrical bushing or inner bushing with external teeth (flex spline), and a cylindrical outer ring or outer bushing with internal teeth. The wave generator can be formed as an elliptical disk with a rolling bearing arranged thereon and optionally a deformable raceway. The flex spline can be designed to be annular or cup-shaped. The flex spline usually serves as an output of the harmonic drive.

The stator carrier can have an in particular annular or sleeve-shaped carrying section and an in particular disk-shaped fastening section. These two sections can be formed as separate elements and be fastened to each other or be formed as a common structural element in a one-piece design. For example, the stator can be fastened on the carrying section and/or the rotor can be mounted rotatably on the fastening section. The stator carrier can be connected to the housing of the drive unit via the fastening section, i.e., be fastened to or in the drive unit.

One or more ducts for electrical signal lines and/or electrical power lines can advantageously be formed on the stator carrier, in particular on the fastening section. This favors simple contacting with short cable lengths because the electrical power lines can be routed through the stator carrier, for example from the electronics to the electric motor.

The stator, the electronics, and/or the rotor can optionally be fastened on the stator carrier, wherein the rotor can be mounted on the stator carrier by a rolling bearing. The stator carrier is a central element of the structural unit which accommodates at least the stator with coils, the rolling bearing of the rotor, and the electronics. The electronics, for example an electronic circuit board, can be arranged on one side of the stator carrier or of the fastening section, for example on an outer side, and the electric motor on the other side, for example an inner side. The electronics are thus arranged separately from the electric auxiliary drive.

The stator carrier can advantageously have a radially outward projecting fastening section by which the stator carrier can be mounted or fixed in the housing of the drive unit, in particular by a press fit. Compact and stable fastening is possible hereby, for example with no separate fastening elements. The external geometry of the stator carrier, for example the outer circumference, can correspond to the internal geometry of the housing, for example the inner circumference. An oil-tight connection between the fastening section and the housing can be produced by virtue of the press fit, for example by using a sealing compound. Lubrication of the drive components can thus take place on one side of the fastening section without affecting the electronics on the other side of the fastening section.

The electric motor can expediently be designed as an external rotor motor, i.e., the rotor of the electric motor can be designed as an external rotor. The rotor surrounds the stator radially on the outside. An advantageous power density and a relatively compact size can be achieved by virtue of this structure.

The rotor can advantageously have a sleeve-shaped coupling section on the output side for coupling to a harmonic drive arranged in the housing, wherein the coupling section can have an elliptical outer contour. The coupling section is thus the output-side interface with the harmonic drive. The wave generator is integrated directly in the rotor of the electric motor as a coupling section. The coupling section is configured to receive the rolling bearing of the wave generator (flex bearing).

The stator of the electric motor can expediently be potted to the stator carrier. The potting compound can extend at least in some regions over the radially outward projecting fastening section and/or the sleeve-shaped carrying section of the stator carrier. Coil windings of the stator can be fixed, and a stiff connection between the stator and the stator carrier produced, by the potting compound. In addition, thermal linkage with the housing can be effected via the stator carrier. Sealing of the electrical signal and power lines or their ducts can also be obtained by the potting compound. The potting compound can, for example, be thermally conductive and/or electrically insulating.

The rotor can advantageously be mounted on the stator carrier in a first bearing point only by just one rolling bearing. Structurally favorable mounting with a small number of components and a small space requirement is created hereby. The magnetic field of the electric motor can represent a second bearing point as a dynamic magnetic bearing as soon as a magnetic field is applied via the stator coils. Mounting of the rotor by a rolling bearing (first bearing point) and a magnetic bearing (second bearing point) is thus produced.

An electrical flex conductor, which has two layers and is designed as a double-layer flex conductor and is connected at one end to the electronics, for example the electronic circuit board, and at the other end has an electrical interface with multiple contact surfaces for connection to a vehicle-side plug, can expediently be provided. Particularly compact electrical line guidance is produced hereby. One layer of the flex conductor can be designed for power transmission as an electrically power-transmitting layer, and the second layer for signal transmission as an electrical signal-transmitting layer.

A groove, in which the flex conductor and the electrical interface are arranged, can advantageously be formed on the outer side of the housing. By virtue of the design as a flex conductor, only a small groove depth is possible for the purpose of line guidance without influencing the internal geometry of the housing of the drive unit. Sections of the flex conductor, for example contact tabs for connection of the flex conductor to the electronics, can be routed, from radially outside to radially inside, through a slot formed in the housing.

The layers of the flex conductor can optionally be covered by a potting compound or a covering, wherein a through opening is formed in the potting compound or the covering at the electrical interface. Mechanical fixing and sealing of the flex conductor in the housing is enabled in this way. The potting compound or the covering can close a groove formed on the outer side of the housing, preferably so that the housing is flush, radially on the outside.

The electrical contact surfaces can advantageously be formed as flat contacts for transmitting electrical power and an electrical signal. The flat contacts do not project, or only to a small extent, from the flex conductor or from a layer of the flex conductor. Installation of the drive unit in the vehicle can thus be facilitated because there is no risk of a protruding plug element shearing off during mounting.

The electronics can expediently have a position sensor system for detecting the rotational position of the bottom bracket shaft of the drive unit, wherein the position sensor system has one or more proximity sensors, fixed to the housing, and an eccentric element, in particular an eccentric ring, fastened non-rotatably to the bottom bracket shaft and interacting with the proximity sensor or sensors. Radial detection of the rotational position of the bottom bracket shaft is thus effected. The proximity sensor or sensors have a detection region in which the eccentric element is situated. The proximity sensor or sensors can be arranged at the electronics or on the electronic circuit board and/or each be designed as a Hall effect sensor, an infrared sensor, or an inductively operating sensor, or the like. The rotational position of the bottom bracket shaft can be determined, based on the spacing, by the proximity sensor because the arrangement of the eccentric element relative to the bottom bracket shaft is known. A change in angle, the angular velocity, and/or the first derivative of the angular velocity can be determined by the position sensor system.

The assembly includes an electrical wiring loom for a manually driven vehicle, in particular a bicycle or an EPAC, and a drive unit. The wiring loom can have a connector plug for connection to the electrical interface of the flex conductor, wherein the connector plug has spring-loaded contact pins for electrically contacting contact surfaces of the flex conductor. A retaining clamp, by which the connector plug can be secured to the drive unit, can be provided, wherein the retaining clamp grips the connector plug and latches (at one end or both ends) into recesses which are formed on the outer side of the housing of the drive unit, in particular the shell surface. The wiring loom can form part of a wiring harness of the vehicle.

With regard to the advantages which can be obtained hereby, reference should be made to the relevant example embodiments of the drive unit. The measures described in connection with the drive unit can serve for further example embodiments of the assembly.

BRIEF DESCRIPTION OF THE DRAWINGS

Example aspects of the invention are explained below with the aid of the drawings, wherein the same elements or those with the same function are provided with identical reference numerals, in which:

FIG. 5 shows the stator carrier of the drive unit from FIG. 1 with a stator and a rotor;

DETAILED DESCRIPTION

Figure 1:
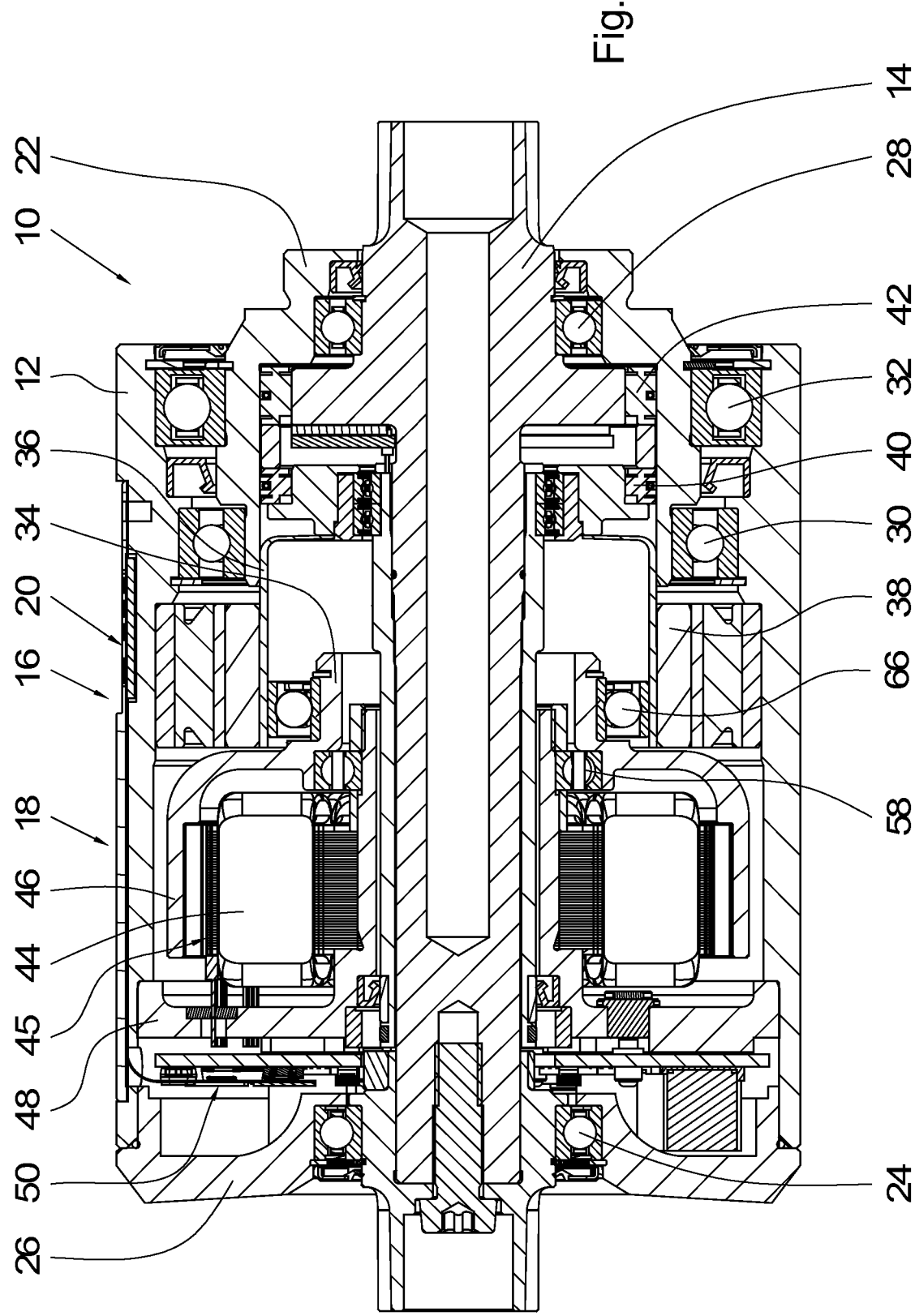
FIG. 1 shows an exemplary embodiment of the drive unit according to example aspects of the invention in a schematic view in section.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a drive unit for a manually driven vehicle such as, for example, a bicycle, wherein the drive unit as a whole is designated by the reference numeral 10.

The drive unit 10 has a housing 12 on or in which the components of the drive unit 10 are arranged. The drive unit 10 has, for manual drive, i.e., drive by muscular force, a bottom bracket shaft 14 which is rotatably mounted in the housing 12 of the drive unit 10. In addition, the drive unit 10 has an electric auxiliary drive 16 which has an electric motor 18 and a harmonic drive 20, wherein the electric motor 18 is mechanically coupled to the harmonic drive 20. The bottom bracket shaft 14 and the auxiliary drive 16 are coupled to a common output shaft 22 on which a chain ring carrier or a chain ring can be fastened (not illustrated).

The bottom bracket shaft 14 is mounted on a housing cover 26, which closes the housing 12 of the drive unit 10 on one side (on the left-hand side in FIG. 1), by a first rolling bearing 24. In addition, the bottom bracket shaft 14 is mounted rotatably on the output shaft 22 by a second rolling bearing 28. The output element 22 is mounted rotatably in the housing 12 by a third rolling bearing 30 and a fourth rolling bearing 32.

The harmonic drive 20 has a wave generator 34, a deformable cylindrical bushing or inner bushing 36 with external teeth (flex spine), and a cylindrical outer ring 38 with internal teeth. The harmonic drive 20 is coupled on the input side to the electric motor 18 and on the output side to the output element 22, and to be precise by a first freewheel clutch 40. The bottom bracket shaft 14 is coupled to the output element 22 by a further second freewheel clutch 42.

The electric motor 18 has a stator 44 with stator coils 45 and a rotor 46. The drive unit 10 furthermore has a stator carrier 48 and an electronic unit 50 which is formed as an electronic circuit board. The stator carrier 48 (FIGS. 1, 2, 4, and 5) has a, for example, sleeve-shaped carrying section 52 and a, for example, disk-shaped fastening section 54. The carrying section 52 and the fastening section 54 are designed as a single piece in the illustrated example embodiment.

The stator carrier 48, the stator 44, the rotor 46, and the electronics 50 are formed as a premountable unit 56 (FIGS. 2 and 5) such that the premounted unit 56 can be mounted as a whole in the housing 12 of the drive unit 10.

The stator 44 is fastened to the carrying section 52 (FIG. 5) and the rotor 46 is mounted rotatably on the carrying section 52 by a rolling bearing 58. The stator carrier 48 can be connected to the housing 12 of the drive unit 10 via the fastening section 54.

Ducts for the electrical signal lines 60 and for the electrical power lines 62 are formed on the stator carrier 48 (FIG. 2), in particular on the fastening section 54. The stator 44, the electronics 50, and the rotor 46 are fastened to the stator carrier 48, wherein the rotor 46 is mounted on the stator carrier 48 by the rolling bearing 58. The electronics or the electronic circuit board 50 are arranged on one side of the stator carrier 48 or the fastening section 54, and the electric motor 18 on the other side.

Figure 2:
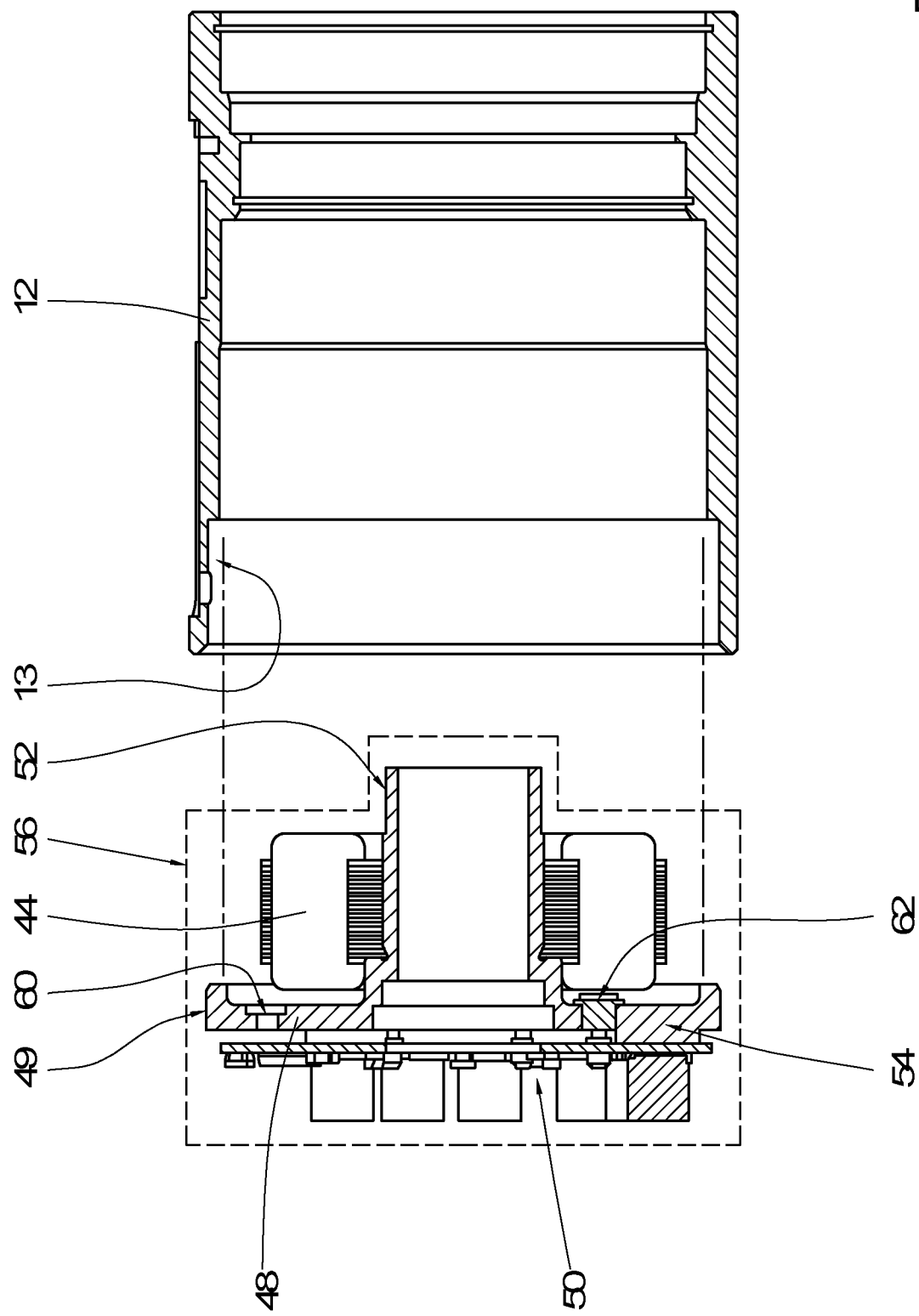
FIG. 2 shows the stator carrier and the housing of the drive unit from FIG. 1.
Figure 3B:
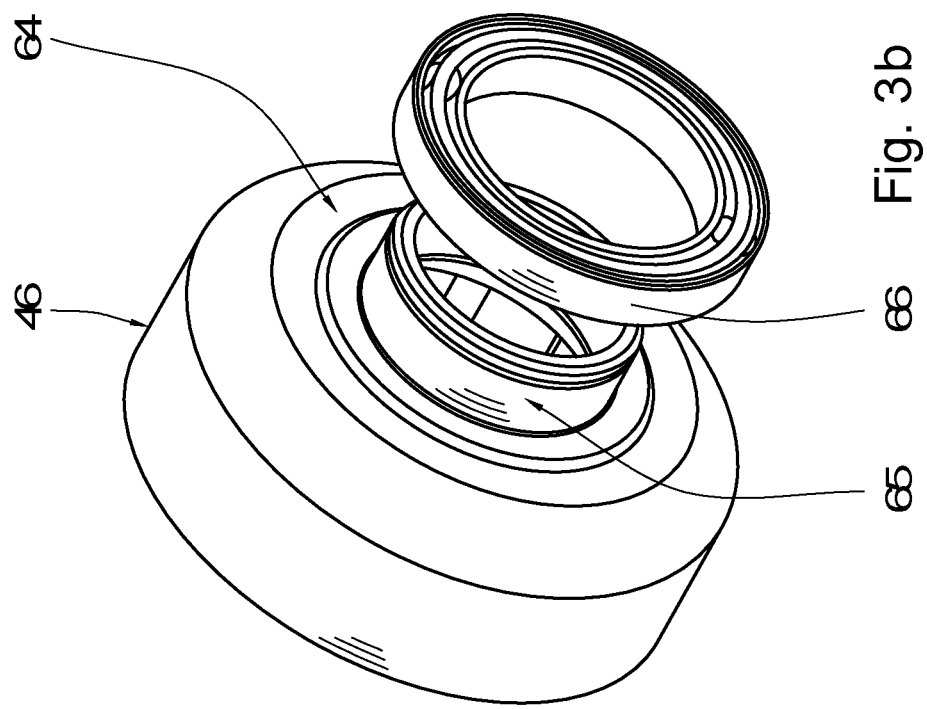
FIGS. 3a,b shows the rotor of the electric motor of the drive unit from FIG. 1 in a side view (FIG. 3a) and in a perspective view (FIG. 3b)
Figure 3A:
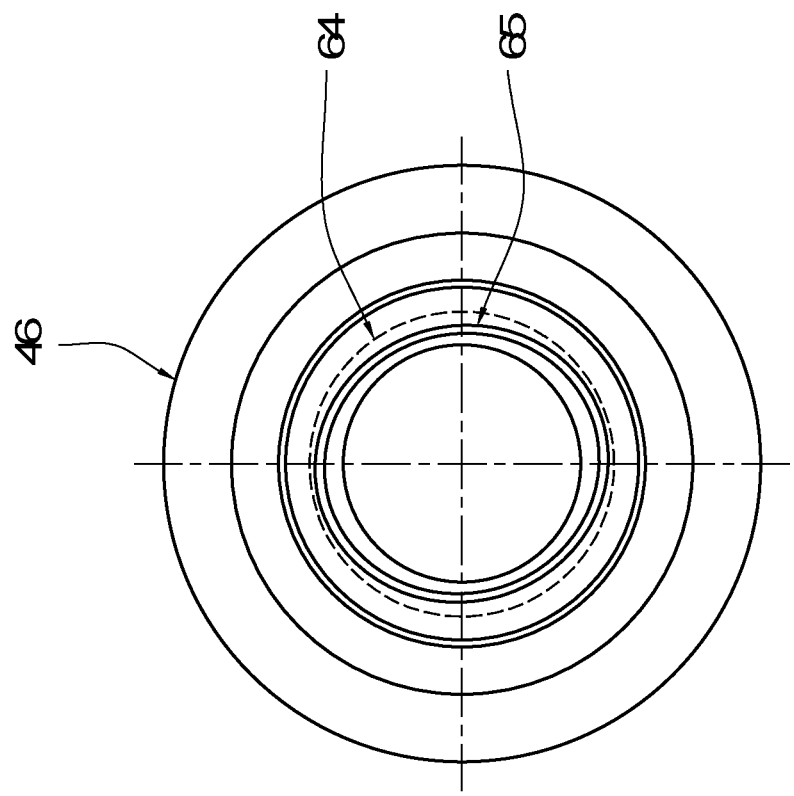
Figure 4:
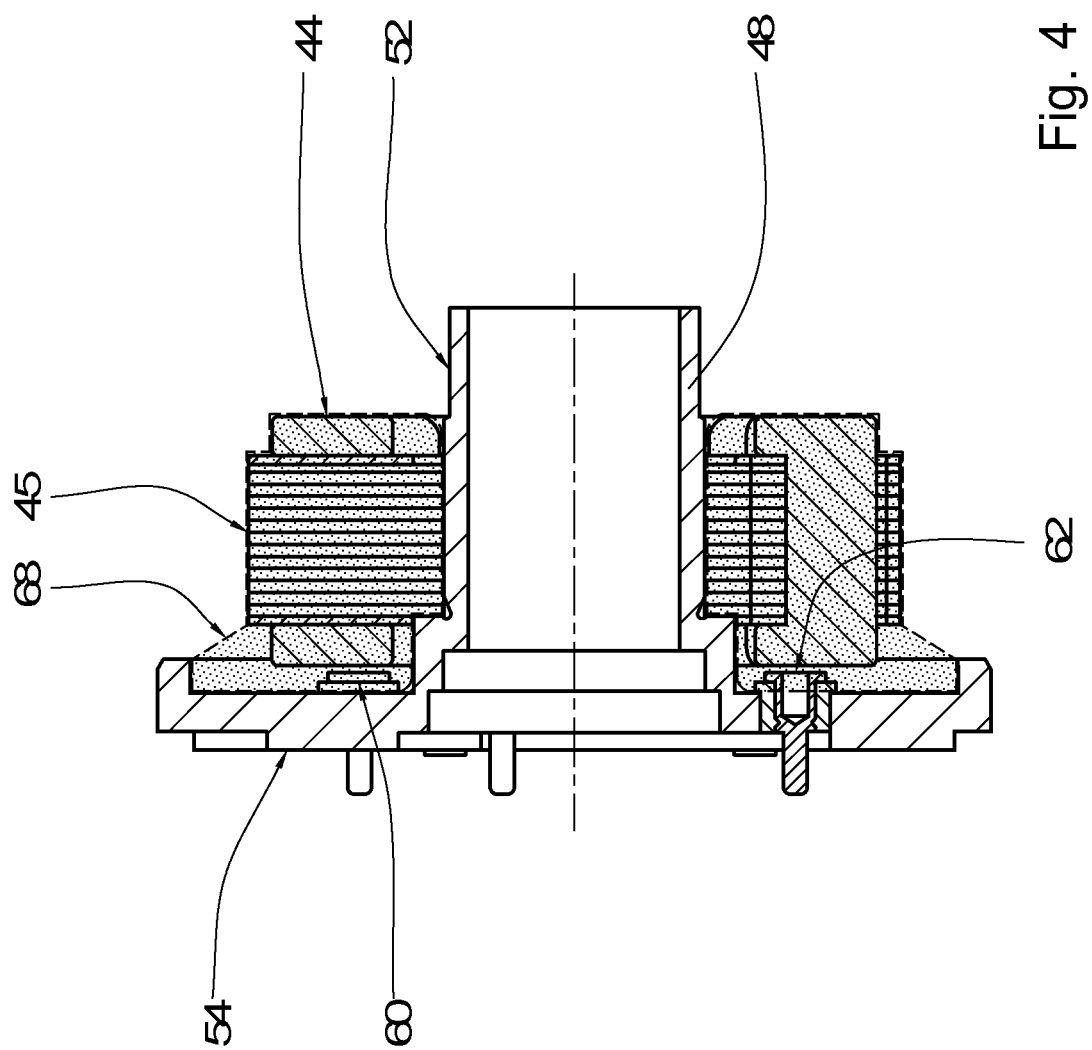
FIG. 4 shows the stator carrier with the stator of the drive unit from FIG. 1.

As already explained, the stator carrier 48 has a radially outward projecting fastening section 54 by which the stator carrier 48 can be mounted in the housing 12 of the drive unit 10, this being effected by a press fit in the example. The external geometry 49 of the stator carrier 48 or the fastening section 54 corresponds to the internal geometry 13 of the housing 12 (FIG. 2). An oil-tight connection between the fastening section 54 and the housing 12 can be produced by virtue of the press fit, for example by using a sealing compound (not illustrated).

The electric motor 18 (FIGS. 1, 5) is designed as an external rotor motor, i.e., the rotor 46 of the electric motor 18 is designed as an external rotor and surrounds the stator 44 radially on the outside.

The rotor 46 (FIGS. 1, 2, 3a, 3b) has on the output side a sleeve-shaped coupling section 64 for coupling to the harmonic drive 20 arranged in the housing 12, wherein the coupling section 64 has an elliptical outer contour 65. The coupling section 64 is thus the output-side interface with the harmonic drive 20. The coupling section 64 is configured to receive the rolling bearing 66 as a flex bearing of the wave generator 20.

In the illustrated example embodiment, the stator 44 (FIG. 4) of the electric motor 18 is fixed to the stator carrier 48 by a potting compound 68. The potting compound 68 extends in some regions over the fastening section 54 and the carrying section 52 of the stator carrier 48. The potting compound 68 mechanically fixes the coil windings 45 of the stator 44. In addition, the potting compound 68 seals the signal and power lines or their ducts 60, 62.

The rotor 46 (FIG. 5) is mounted on the stator carrier 48 only by one rolling bearing 58 as the first bearing point. The magnetic field of the electric motor 18 forms a second bearing point 70 as a "dynamic magnetic bearing" as soon as a magnetic field is applied via the stator coils.

In addition, a flex conductor 72 (FIGS. 6a,b, 7, 8a, 8b), which is designed as a double-layer flex conductor and has two layers 74, 76 and is connected at one end to the electronics 50, or the electronic circuit board, and at the other end has an electrical interface 78 with multiple flat contact surfaces 79 for connection to a vehicle-side plug 204, can be provided. A first layer 74 of the flex conductor 72 is designed as an electrically power-transmitting layer 74 and the second layer 76 as an electrically signal-transmitting layer 76.

Figure 6B:
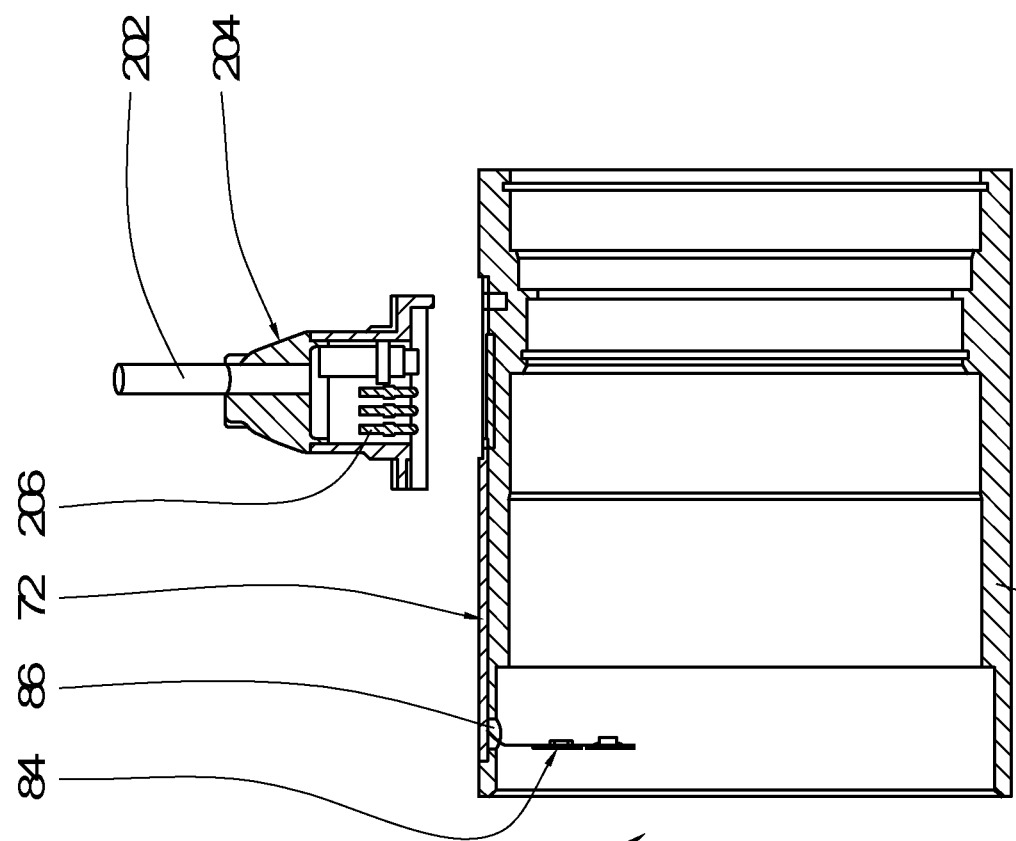
FIGS. 6a,b show the housing of the drive unit from FIG. 1 with a flex conductor and a plug of a vehicle-side wiring loom in a perspective view (FIG. 6a) and in a view in section (FIG. 6b)
Figure 6A:
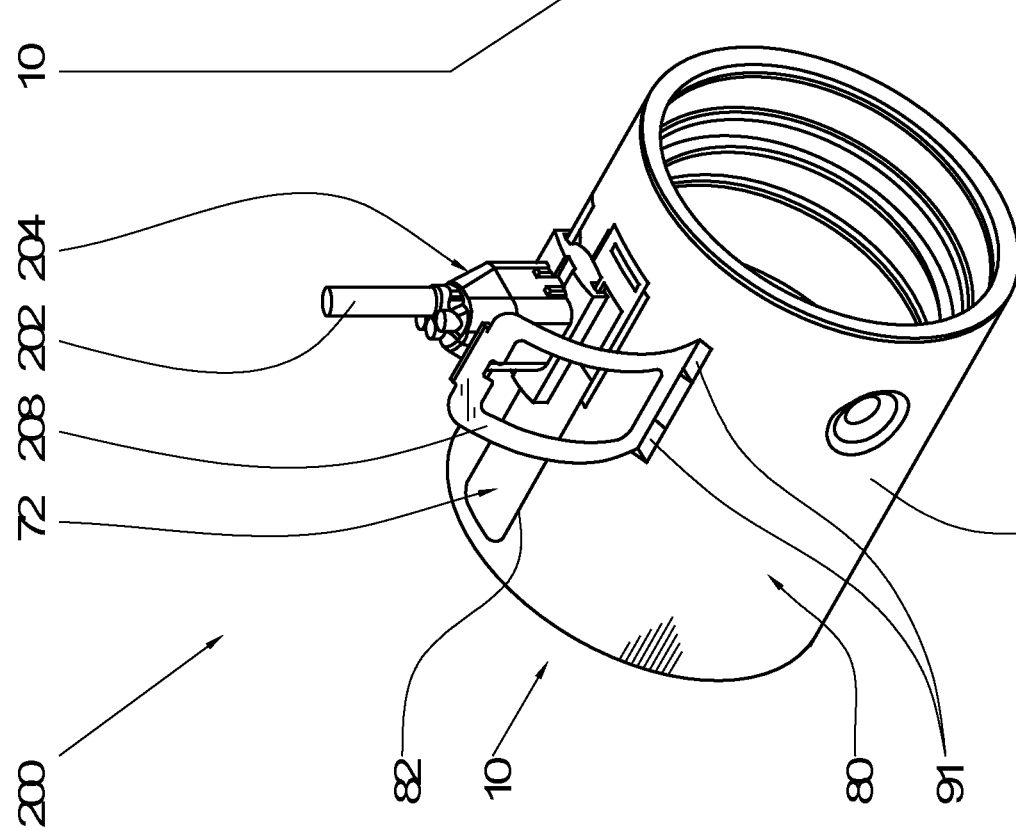
Figure 7:
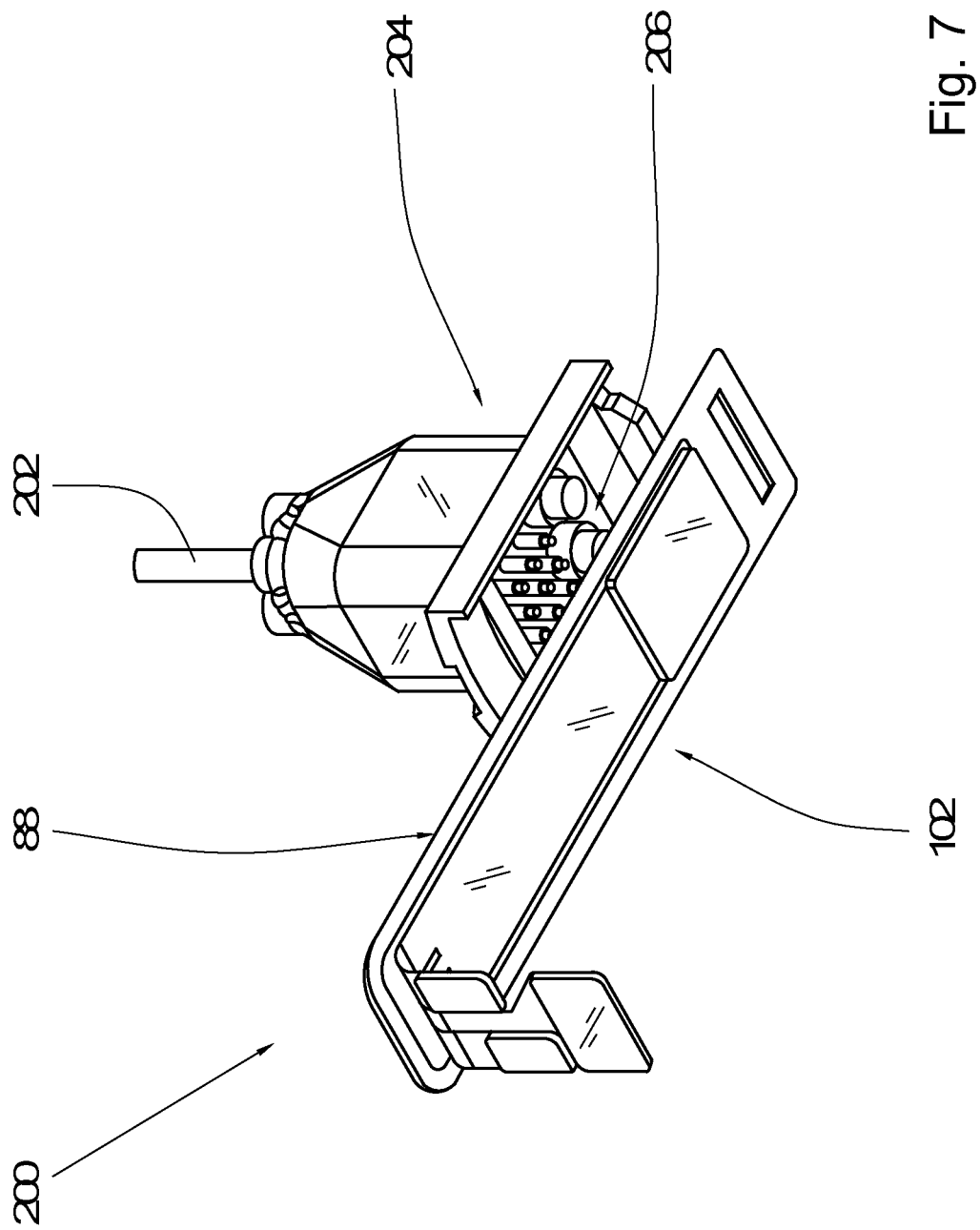
FIG. 7 shows the flex conductor and the plug from FIGS. 6a,b in a perspective view from below.

A groove 82, in which the flex conductor 72 and the electrical interface 78 are arranged, is formed on the outer side 80 of the housing 12 (FIGS. 6*a,b*). Sections of the flex conductor 72, for example contact tabs 84 for connection of the flex conductor 72 to the electronics 50, can be routed (from radially outside to radially inside) through a slot 86 formed in the housing 12.

The layers 74, 76 of the flex conductor 72 can be covered by a potting compound or a covering 88, wherein a through-opening 89 is formed (in the potting compound or the covering 88) at the electrical interface 78. The potting compound or covering 88 can close the groove, preferably so that the housing 12 is flush, radially on the outside.

Figure 8B:
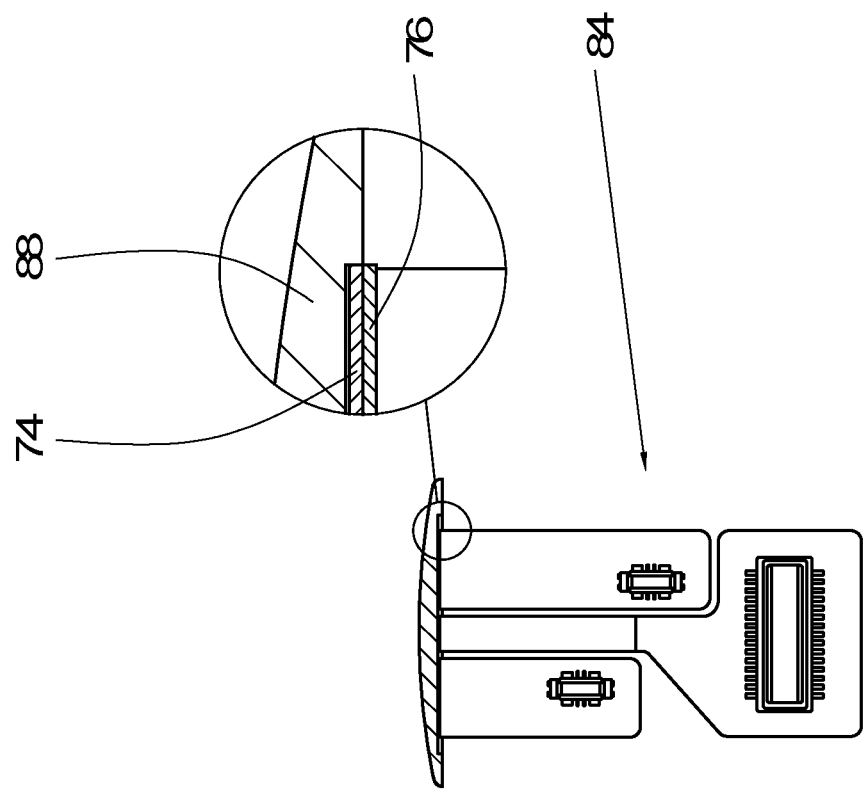
FIGS. 8a,b show the flex conductor from FIGS. 6a,b and FIG. 7 in an exploded view (FIG. 8a) and in an assembled state (FIG. 8b)
Figure 8A:
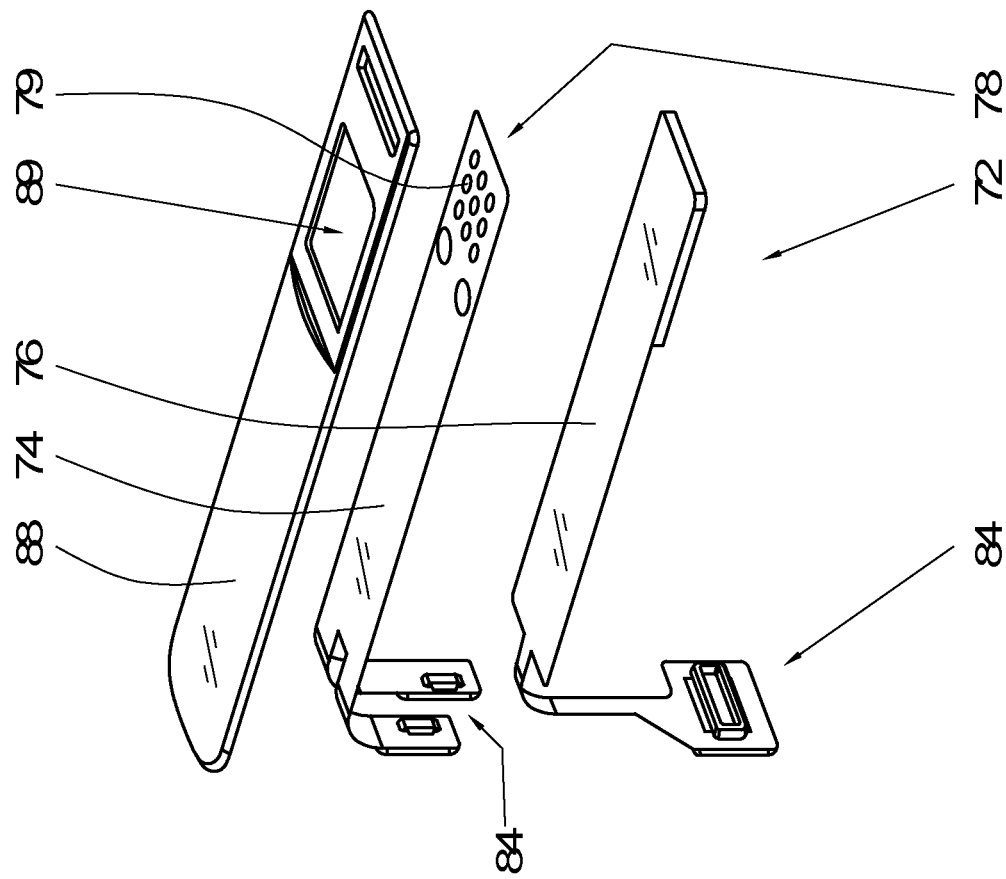

The contact surfaces 79 are designed as flat contacts 79 and do not project, or only to a small extent, from the flex conductor 72 or from a layer 74, 76 of the flex conductor 72 (FIGS. 8*a,b*).

FIGS. 6*a*, 6*b*, 7, 8*a*, and 8*b* show an assembly 200 including a wiring loom 202, illustrated only partially, for a manually driven vehicle and a drive unit 10. The wiring loom 202 has at one of the ends of the wiring loom 202 a plug 204 for connection to the electrical interface 78 of the flex conductor 72. The connector plug 204 has spring-loaded contact pins 206 for electrically contacting the corresponding contact surfaces 79 of the flex conductor 72.

In addition, a retaining clamp 208, by which the connector plug 204 can be secured to the drive unit 10, can be provided (FIG. 6*a*). The retaining clamp 208 is designed so as to grip the connector plug 204 and to engage at one end or both ends in recesses 91 which are formed on the outer side 80 of the housing 12 of the drive unit 10. The connector plug 204 is consequently secured on the housing 12.

Figure 9A:
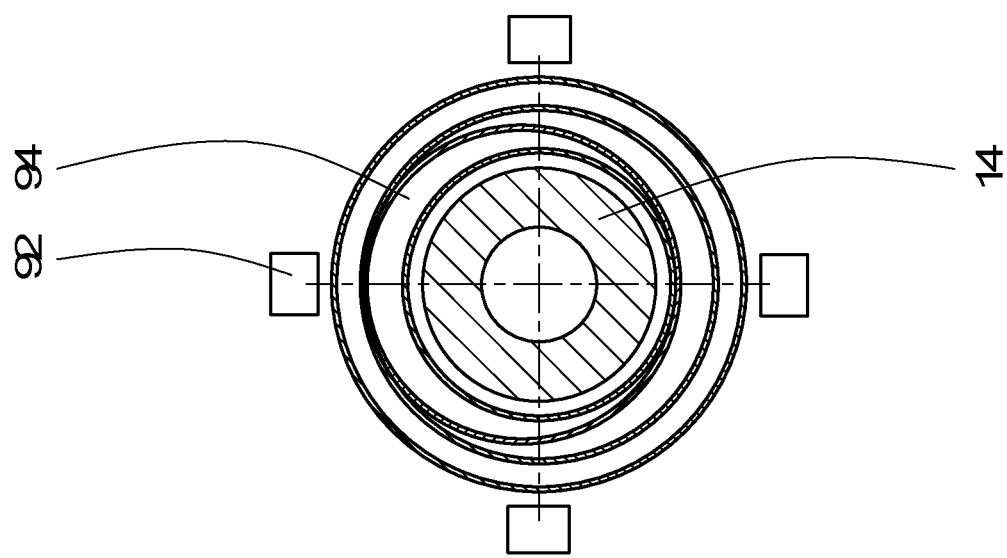
FIGS. 9a,b show the position sensor system of the drive unit from FIG. 1 in a view in section (FIG. 9a) and in a side view (FIG. 9b).
Figure 9B:
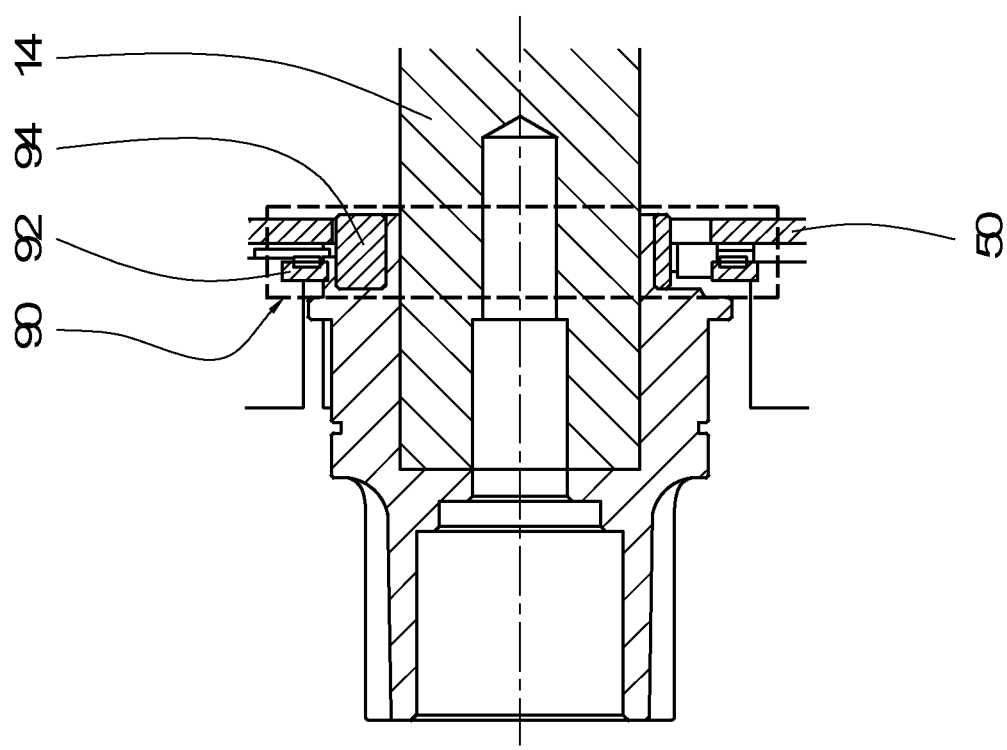

The electronics (FIGS. 9*a,b*) have a position sensor system 90 for detecting the rotational position of the bottom bracket shaft 14 of the drive unit 10, wherein the position sensor system 90 has a plurality of proximity sensors 92, four proximity sensors 92 in the example embodiment illustrated here, distributed over the circumference and an eccentric element, for example an eccentric ring 94, fastened non-rotatably to the bottom bracket shaft 14 and interacting with the proximity sensors 92.

The proximity sensors 92 are arranged on the electronics 50 or on the electronic circuit board. The proximity sensors 92 can each be designed as a Hall effect sensor, an infrared sensor, or an inductively operating sensor or the like.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

LIST OF REFERENCE NUMERALS

10 Drive unit
12 housing
13 internal geometry
14 bottom bracket shaft
16 auxiliary drive, electric
18 electric motor
20 harmonic drive
22 output element
24 first rolling bearing
26 housing cover
28 second rolling bearing
30 third rolling bearing
32 fourth rolling bearing
34 wave generator
36 inner bushing, flex spline
38 outer ring
40 first freewheel clutch
42 second freewheel clutch
44 stator
45 coil
46 rotor
48 stator carrier
49 external geometry
50 electronics, electronic circuit board
52 carrying section
54 fastening section
56 premountable unit
58 first bearing point, rolling bearing
60 duct for signal lines
62 duct for power lines
64 coupling section
65 elliptical outer contour
66 rolling bearing (flex bearing)
68 potting compound
70 second bearing point, magnetic bearing
72 flex conductor
74 first layer
76 second layer
78 electrical interface
79 contact surfaces
80 outer side
82 groove
84 contact tab
86 slot
88 potting compound, covering
89 through opening
90 position sensor system
91 recess
92 proximity sensor
94 eccentric element, eccentric ring
200 assembly
202 wiring loom
204 plug
206 contact pins
208 retaining clamp

The invention claimed is:

1. A drive unit (10) for a manually driven vehicle, namely a bicycle or an EPAC, comprising:
    a housing (12);
    an electric motor (18) with a stator (44) and a rotor (46);
    a stator carrier (48); and
    electronics (50),
    wherein the stator carrier (48), the stator (44), the rotor (46), and the electronics (50) are formed as a premountable unit (56) such that the premounted unit (56) is mountable in the housing (12)
    wherein one or more ducts (60, 62) for electrical signal lines and electrical power lines are formed on the stator carrier (48); and
    wherein the stator (44), the electronics (50), and the rotor (46) are fastened on the stator carrier (48); and
    wherein the rotor (46) is mounted on the stator carrier (48) by a rolling bearing (58).

2. The drive unit (10) of claim 1, wherein the stator carrier (48) has a radially outward projecting fastening section (54) by which the stator carrier (48) is mountable or fixable in the housing (12) of the drive unit (10) by a press fit between the stator carrier (48) and the housing (12).

3. The drive unit (10) of claim 1, wherein the electric motor (18) is an external rotor motor.

4. The drive unit (10) of claim 1, wherein the rotor (46) comprises a sleeve-shaped coupling section (64) for coupling to a harmonic drive (20) arranged in the housing (12), and the sleeve-shaped coupling section (64) has an elliptical outer contour (65).

5. The drive unit (10) of claim 1, wherein the stator (44) of the electric motor (18) is potted to the stator carrier (48).

6. The drive unit (10) of claim 1, wherein the rotor (46) is mounted on the stator carrier (48) only by the rolling bearing (58), the rolling bearing (58) being a single rolling bearing.

7. The drive unit (10) of claim 1, further comprising a flex conductor (72) with two layers (74, 76), wherein the flex conductor (72) is connected at one end to the electronics (50) and at the other end comprises an electrical interface (78) with a plurality of contact surfaces (79) for connection to a vehicle-side plug (204).

8. The drive unit (10) of claim 7, wherein a groove (82) is formed on an outer side (80) of the housing (12), the flex conductor (72) and the electrical interface (78) are arranged in the groove (82), the layers (74, 76) of the flex conductor (72) are covered by a potting compound or a covering (88), and a through-opening (89) is formed at the electrical interface (78).

9. The drive unit (10) of claim 1, wherein the electronics (50) comprises a position sensor system (90) for detecting a rotational position of a bottom bracket shaft (14) of the drive unit (10), the position sensor system (90) comprises an eccentric ring (94) and one or more proximity sensors (92), the eccentric ring (94) fastened non-rotatably to the bottom bracket shaft (14) and interacting with the one or more proximity sensors (92).

10. An assembly (200), comprising
a wiring loom (202) of a manually driven vehicle, namely a bicycle or an EPAC; and
the drive unit (10) of claim 7,
wherein the wiring loom (202) comprises a connector plug (204) for connection to the electrical interface (78) of the flex conductor (72), the connector plug (204) comprises spring-loaded contact pins (206) for contacting the contact surfaces (79), and/or the connector plug (204) is secured to the drive unit (10) by a retaining clamp (208), the retaining clamp (208) gripping the connector plug (204) and latchable into recesses (91) formed on an outer side (80) of the housing (12) of the drive unit (10).

11. A drive unit (10) for a manually driven vehicle, namely a bicycle or an EPAC, comprising:
a housing (12);
an electric motor (18) with a stator (44) and a rotor (46);
a stator carrier (48);
electronics (50); and
a flex conductor (72) with two layers (74, 76), wherein the flex conductor (72) is connected at one end to the electronics (50) and at the other end comprises an electrical interface (78) with a plurality of contact surfaces (79) for connection to a vehicle-side plug (204),
wherein the stator carrier (48), the stator (44), the rotor (46), and the electronics (50) are formed as a premountable unit (56) such that the premounted unit (56) is mountable in the housing (12).

12. A drive unit (10) for a manually driven vehicle, namely a bicycle or an EPAC, comprising:
a housing (12);
an electric motor (18) with a stator (44) and a rotor (46);
a stator carrier (48); and
electronics (50), the electronics (50) comprising a position sensor system (90) for detecting a rotational position of a bottom bracket shaft (14) of the drive unit (10), the position sensor system (90) comprising an eccentric ring (94) and one or more proximity sensors (92), the eccentric ring (94) being fastened non-rotatably to the bottom bracket shaft (14) and interacting with the one or more proximity sensors (92)
wherein the stator carrier (48), the stator (44), the rotor (46), and the electronics (50) are formed as a premountable unit (56) such that the premounted unit (56) is mountable in the housing (12).

* * * * *